United States Patent Office 3,766,109
Patented Oct. 16, 1973

3,766,109
EPOXY POWDERS CONTAINING SMA COPOLYMERS
Richard J. Pratt, Arlington Heights, Arthur W. Crowley, Hazel Crest, Steven B. Nason, Chicago, and William R. Schmehr, Hoffman Estates, Ill., assignors to Atlantic Richfield Company, New York, N.Y.
No Drawing. Continuation of abandoned application Ser. No. 81,158, Oct. 15, 1970. This application Jan. 26, 1973, Ser. No. 326,925
Int. Cl. C08g 45/04
U.S. Cl. 260—23 EP
3 Claims

ABSTRACT OF THE DISCLOSURE

A process for the preparation of improved thermosetting powder compositions containing styrene-maleic anhydride resins, epoxy resins, low melting anhydrides and a curing catalyst utilizes initial melt-mixing and mill-roll catalyzing procedures before grinding to achieve "B-staging" or "partial curing" of the compositions. The resultant free flowing powders have long shelf-life and are useful for fluidized bed and spray coatings and one step molding and transfer molding operations.

---

This is a continuation of application Ser. No. 81,158 filed Oct. 15, 1970.

This invention relates to the improved preparation of thermosetting powder compositions containing as essential ingredients low molecular weight styrene-maleic anhydride copolymers, low melting carboxylic acid anhydrides as hardeners, epoxy resins and curing catalysts. These compositions have previously been prepared by the methods described in Ser. No. 781,960, filed Dec. 6, 1968, and now abandoned. The improved thermosetting powders are prepared by a procedure utilizing initial melt-mixing of the anhydride and styrene-maleic acid copolymer hardeners and then the epoxy resins followed by mill-roll catalyzation to effect uniform mixture of the ingredients before grinding to form the powders. The formulation procedure effects improved "B-staging" or "partial curing" of the compositions. The "B-staging" is important as it lowers cure requirements, shortens gel time and improves compatibility and uniformity of the compositions.

More particularly, the procedure for formulating improved epoxy powders comprises the general steps of:

(1) Melt-mixing the low molecular weight styrene-maleic anhydride copolymer and low melting carboxylic acid anhydride until a clear solution results,
(2) Adding epoxy resin to the hot solution and stirring until solution or dispersion occurs,
(3) Transferring the uncatalyzed molten mass to a roll mill and band maintained at or above the softening point of the mixture,
(4) Adding a curing catalyst evenly over the surface of the epoxy band,
(5) Folding and passing the band continuously until intimate, uniform mixing is accomplished,
(6) Removing and cooling the band of uniform mixture and grinding it to pass about 20 mesh screen,
(7) Ball-milling the ground composition to form a partially cured epoxy powder having at least about 75 percent of the particles of less than 100 mesh.

The "B-staging" is thought to occur from reaction of anhydride groups from either the low molecular weight styrene-maleic anhydride copolymers or the low melting carboxylic acid anhydride or both with the epoxy resin throughout the formulation procedure. Additionally, the various formulation steps should be carried out under carefully regulated temperature conditions as explained hereinafter.

The low molecular weight styrene-maleic anhydride copolymers useful in this invention can be prepared by conventional polymerization methods. Solution polymerization methods can be employed using a suitable solvent and a free radical catalyst, such as benzoyl peroxide or dicumyl peroxide, at a temperature of about 75° to 300° C. or more. Suitable solvents for such solution polymerization include aromatic hydrocarbons such as cumene, p-cumene, xylene, toluene and the like. Adjustment of the monomer ratios of styrene to maleic anhydride produces copolymers having molar ratios of polymerized styrene to polymerized maleic anhydride of about 1:1 to 10:1 with average molecular weights within the range of about 500 to 5000, preferably about 500 to 2000. Molar ratios of styrene to maleic anhydride of 1:1 to about 4.5:1 are preferred. The best results are generally achieved with molar ratios in the range of 3:1 to 4.5:1. The styrene maleic anhydride copolymers useful herein have a functionality of at least two or even at least three anhydride rings per molecule.

The low melting carboxylic acid anhydrides useful in this invention are generally those anhydrides which have a melting point below about 100° C., preferably below 35° C., and are soluble in the low molecular weight styrene-maleic anhydride copolymers. The most advantageous anhydrides are, therefore, those which are liquids at room temperatures. Exemplary of the operative anhydrides are hexahydrophthalic anhydride, dodecenyl-succinic anhydride, methylnadic anhydride, tetrahydrophthalic anhydrides, endomethanotetrahydrophthalic anhydride, phthalic anhydride, or methyltetrahydrophthalic anhydride.

Epoxy resins are well known in the art. Exemplary types are Shell Chemicals "Epon" resins, epoxy polyethers of polyhydric phenols such as the glycidyl ethers of bisphenol A (i.e. the condensation products of epichlorhydrin and p,p'-isopropylidenediphenol), the cycloaliphatic epoxide resins, epoxidized novolac resins, epoxidized oils such as epoxidized soybean, cottonseed or linseed oil and epoxidized phenol formaldehyde resins. Further exemplary of specific useful epoxide resins are those disclosed in U.S. Pats. 3,336,251; 3,344,096; 3,362,922 and 3,384,610. The controlling factors regarding the utilization of these various epoxide resins are the melting point of the final powder composition and compatibility with the styrene-maleic anhydride copolymer; the melting point of the partially cured, powdered epoxy coating compositions should be less than about 100° C. These powders avoid caking and cold flowing in storage and use. The preferred epoxy resins are diglycidyl ethers of bisphenol A (DGEBA), which may be represented by the general formula:

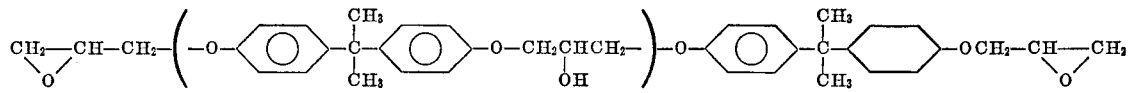

wherein $n$ has an average value of from about 2 to 8. When $n$ is less than 4, generally solutions are formed with the styrene-maleic anhydride copolymer and low melting anhydride, while when $n$ is greater than 4, dispersions generally occurred.

The curing catalysts found useful in the formulation procedure include tertiary amines, such as benzyldimethylamine and dimethylaminomethyl phenol, metal salts, particularly carboxylic acid salts such as zinc or stannous octoate, boron oxide, boron trifluoride amine complexes, such as boron trifluoride monoethyl amine complex, antimony trioxide, triethanolamine borate-chromium acetylactonate mixtures and dibutyl tin dilaurate. The preferred catalysts are benzyldimethylamine and zinc octoate. The curing catalysts are generally present at levels of from about 0.1 to 2.0 percent by weight, preferably from about 0.5 to 1.25 percent by weight. Optionally, fillers may be utilized as an ingredient of the thermosetting epoxy powders prepared herein by the formulation procedures. The fillers are added during the mill roll banding step, preferably before the catalyst addition. Suitable fillers are silica, bentonite talc, mica, metal oxides such as titanium dioxide and barium and calcium sulfates and carbonates. Filler level is dictated by the desired degree of flexibility, coating appearance, handling properties, powder density and cost. The epoxy powders prepared will tolerate up to about 50 percent by weight of filler. For maximum flexibility and optimum coating appearance about 5 to 25 percent by weight of filler is desirable while 20 to 30 percent by weight of titanium dioxide should be used for powders giving high gloss coatings. Furthermore, various colorants such as pigments and dyes may be added with the filler to enhance the final coatings.

The formulation procedures of this invention include the following general steps, now described in more detail regarding the operative conditions:

First, the low molecular weight styrene-maleic acid copolymer and low melting carboxylic acid anhydrides are melt mixed until a clear solution occurs. This step is general accomplished by heating the copolymer and anhydride, with stirring, for about 30 to 40 minutes between about 110° to 180° C., preferably between about 150° to 180° C. Longer heating periods are acceptable but are normally unnecessary. Higher temperatures may be employed but would require some cool down time before addition of the epoxy resin. The molar ratio of copolymer to low melting anhydride is normally between about 1:1 to 9:1.

Second, the epoxy resin is added to the clear, hot solution of copolymer and anhydride, and the mixture is stirred until solution or dispersion occurs. The mixture normally must be maintained above about 130° C. to achieve satisfactory solution or dispersion. Epoxy resins of the preferred type wherein $n$ is 4 or less normally dissolve in about 10 to 15 minutes after melting while those wherein $n$ is greater than 4 are sufficiently dispersed about 30 to 45 minutes after melting. Compositions with anhydride to oxirane (epoxy ring) equivalent ratios of 0.4 to 2:1 are useful while ratios of 0.4:1 to 1.2:1 are preferred.

Third, the uncatalyzed mass of copolymer, anhydride and epoxy resin is transferred to a roll mill and bend maintained at or above the particular mixture. Preferably a heated two-roll plastic mill is used. The milling temperature is set according to the softening temperature of the resin mix which is between about 40° and 140° C.

The mill roll banding step affords intimate mixing of the ingredients. If milling is not convenient after solution or dispersion, the mixture may be solidified and rough ground for later milling.

Fourth, during the mill roll banding of the resin mixture a curing catalyst and, if desired, a filter are added evenly over the band.

Fifth, the band with added catalyst and, optionally, added filler is folded and passed through the nip of the roll-mill. This procedure is repeated until uniformity of mixture is accomplished. The milling time for the mixture of the filler, which is preferably added before catalyst addition, is generally about 3 to 5 minutes. Catalyst addition and mixing requires a milling time of about 2 to 3 minutes, regardless of the presence or absence of filler. Longer milling times after catalyzation tend to effect gellation and unmanageable powders; also, catalyst addition is normally effected dropwise in a short period to avoid the undesirably long milling times.

Sixth, the band of uniform composition formed during roll-mill banding is removed and cooled. When sufficiently cooled, preferably to room temperature, the band is rough ground so that at least about 75 percent by weight of the particles will pass a screen of about 20 mesh.

Seven, the rough ground composition is ball milled either by procedures common in industrial practice or by laboratory or small scale techniques such as with porcelain cylindrical impactors in a small capped vessel. Using such a small scale procedure, 75 percent recovery of 100 mesh powder was accomplished after about two hours of milling at 120 r.p.m., while 95 percent recovery of 100 mesh powder was achieved after about five hours of milling.

The formulation procedure described herein is advantageous in the preparation of cold flow resistant and free flowing epoxy powders. More particularly, the formulation procedure effects controlled "B-staging" (partial curing of ingredients) thus lowering the ultimate cure requirements of the system when used in coating and molding operations and improving the compatibility of of the ingredients resulting in improved homogeneity. For example, catalyzed resin mixtures were ball milled with filler, and resin compositions having both catalyst and filler already present were ball milled, both without the mill roll banding step. Neither method gave powder compositions having the desired degree of "B-staging" or partial cure, presumably due at least partially to non-homogeneity of mixture of the ingredients. The disclosed formulation method thus prepares a "total solids" composition having improved properties useful in fluidized bed, electrostatic and spray coatings as well as transfer casting and molding.

The prior art discloses procedures for preparing epoxy powders useful in coating and molding operations by dry blending and fusion blending techniques as indicated in U.S. Pats. 3,336,251 and 3,344,096. Also, the prior art discloses the preparation of epoxy powders useful as coating compositions by one step grinding procedures utilizing a pebble mill containing cylindrical high density grinding media as indicated in U.S. Pat. 3,362,922. Another pror art procedure for preparing epoxy powder compositions disclosed in U.S. Pat. No. 3,384,610 utilizes an initial step of blending the epoxy resin and catalyst and optionally a filler on a heated two-roll plastics mill to obtain mixing followed by cooling, pulverizing and subsequent dry blending with a suitable anhydride in a ball mill to form a blend of the powders. These procedures were attempted using the low molecular weight styrene-maleic anhydride copolymer, a low melting carboxylic acid anhydride, epoxy resin and curing catalysts. However, by these prior art procedures powders were formed from which coatings free from gel particles could not be formed. However, by our formulation procedure wherein hot roll milling of all ingredients at or above the softening temperature of the mixture, partially cured powders producing coatings free from gel particles are formed. By the disclosed formulation procedure, therefore, an improved epoxy powder (of the type disclosed in Ser. No. 781,960) is formed.

The following are non-limitative examples of the disclosed formulation procedure and coating procedure.

EXAMPLE I

Melt-mixing

| Materials: | Weight (g.) |
|---|---|
| Hexahydrophthalic anhydride (B2a, Allied Chemical, Technical Grade) | 44.3 |
| Styrene-maleic anhydride (4:1 styrene:maleic) copolymer, equivalent weight=510 grams per unit of anhydride | 103.0 |
| Epon 1004 (Shell Chemical DGEBA with equivalent weight=980 grams per unit of oxirane) | 352.0 |

The hexahydrophthalic anhydride was placed in a one-liter glass resin kettle immersed in an oil bath heated to 335° F. The resin kettle was equipped with a perforated flat blade driven by high-torque Cole-Parmer stirrer. When the stirred anhydride reached 330-335° F., the copolymer was added gradually. In 10 to 15 minutes, the copolymer melted and dissolved affording a clear liquid. The epoxy resin was then added, in portions, over a 12-minute period. Stirring at 335° F. was cotinued for 36 to 45 minutes during which time the two liquid phases formed a microscopically visible dispersion. The liquid mass solidified on cooling in a large shallow metal pan. Melting point of the mixture was 86-98° C.

EXAMPLE II

Mill mixing of filler

| Materials: | Weight (g.) |
|---|---|
| Above prepared resin | 60.0 |
| Silica #219 (Whittaker, Clark and Daniels, Inc.) | 7.5 |
| Titanium dioxide (Ti-Pure R911, E. I. du Pont de Nemours & Company) | 4.2 |

The solid resin was placed on a moving 2-roll (3" x 9") rubber mill (W. R. Thropp and Sons, J. M. Lehman Co., #2597); one roll had been cooled to 25° C. (or room temperature) while the other had been heated initially to about 140° C. Cooling (line water) was effected to about 60° C. after the resin melted and banded. Silica and titanium dioxide were mixed together thoroughly and the mixture was added in portions during manual folding of the band after which the folded band was placed into the nip and allowed to mill for several minutes.

EXAMPLE III

Mill roll catalyzation

| Materials: | Weight (g.) |
|---|---|
| Above filled resin | 71.7 |
| Zinc (22% metal) octoate, liquid (Advanced Division, Carlisle Chemical Works, Inc) | *0.6 |

*1% on weight of resin mixture.

After the filled resin had banded for several minutes, it was removed, folded and placed in the nip where the folds could be treated with the dropwise addition of zinc octoate over as wide an area as possible. Every thirty seconds the band was stripped from the roll, folded and placed between the nip; these operations were carrier out for two to three minutes before finally removing the band, cooling and storing it in a sealed jar. The solid melts at 92-105° C.

EXAMPLE IV

For preparing a coating, a small portion of solid was pestle ground in a mortar and placed on a steel panel heated to 300-310° F. A draw-down bar grapped for 20 mil clearance was drawn slowly across the powder until reaching the end of the panel. The coated panel was then heated for 10 minutes at 200° C. At room temperatures, direct impact with ⅝" impactor resulted in 56 in.-lb. before cracking a 10 mil thick coating. Although the coating softens slightly on a five-minute exposure to acetone, recovery is complete in 1 to 2 minutes.

We claim:
1. A method of preparing a partially cured, powdered epoxy coating composition having a melting point of less than about 100° C. comprising:
   (a) a styrene-maleic anhydride copolymer having a molecular ratio of styrene to maleic anhydride of about 3:1 to 4.5:1, the molecuar weight of the copolymer being about 500 to about 5000 and said copolymer having at least two anhydride rings per molecule,
   (b) a low melting carboxylic acid anhydride having a melting point below about 100° C., and selected from the group consisting of dodecenylsuccinic anhydride, nadic methyl anhydride, methyltetrahydrophthalic anhydride, hexahydrophthalic anhydride, and mixtures thereof;
   (c) an epoxy resin compatible with said copolymer, and
   (d) a curing catalyst,
wherein the mole ratio of (b) to (a) is about 1:1 to 9:1 and the ratio of anhydride equivalents of the styrene-maleic anhydride copolymer and low melting anhydride mixture to epoxy equivalents of the epoxy resin is about 0.4:1 to 2:1, which preparative method comprises the steps of:
   (1) melt-mixing the copolymer and low melting anhydride at a temperature within the range from about 110° C. to about 180° C. until a clear solution results,
   (2) adding the epoxy resin to the clear, hot solution of (1) and maintaining the mixture above about 130° C. until solution or dispersion occurs,
   (3) transferring the uncatalyzed molten mass of (2) to a roll-mill and band maintained at or above the softening temperature of the mixture which temperature is in the range of about 40° C. to 140° C., and while maintaining the band adding up to 50 percent by weight of a filler to the band, folding and passing the band through the nip of the roll-mill continuously until intimate, uniform mixing of ingredients is accomplished, said filler being selected from the group consisting of silica, bentonite, talc, mica, metal oxides, barium sulfate, barium carbonate, calcium sulfate, calcium carbonate, and mixtures thereof,
   (4) adding a curing catalyst evenly over the surface of the band formed in (3), said catalyst being selected from the group consisting of benzyldimethylamine, zinc octoate, stannous octoate, boron oxide, boron trifluoride monoethylamine complex, antimony trioxide, triethanolamine borate-chromium acetylactonate mixture, dibutyl tin dilaurate, and mixtures thereof;
   (5) folding and passing the band of (4) through the nip of the roll-mill continuously until intimate, uniform mixing of ingredients is accomplished,
   (6) removing the band of uniform composition of (5), cooling and grinding the composition sufficiently fine to pass about 20-mesh screen and

(7) ball-milling the ground composition of (6) to form a partially cured, epoxy powder having at least about 75 percent of the particles of less than about 100-mesh.

2. A method of claim 1 wherein the filler is silica or titanium dioxide present in 5 to 30 percent by weight.

3. A method of claim 1 wherein the catalyst is benzyl-dimethylamine or zinc octoate present from 0.1 to 2.0 percent by weight.

References Cited

UNITED STATES PATENTS

| | | | |
|---|---|---|---|
| 3,484,398 | 12/1969 | Childs | 260—18 |
| 3,417,045 | 12/1968 | Henson et al. | 260—37 |
| 3,535,289 | 10/1970 | Kato et al. | 260—78.4 |
| 3,269,974 | 8/1966 | Childs | 260—37 |

OTHER REFERENCES

"Handbook of Epoxy Resins," Lee et al., pp. 20–13 and 20–14, McGraw-Hill Book Co., 1967, TP 1180.E6.

DONALD E. CZAJA, Primary Examiner

E. C. RZUCIDLO, Assistant Examiner

U.S. Cl. X.R.

260—18 EP, 23 ST, 37 EP, 78.4 EP, 836 R, 837 R